United States Patent [19]
Takeuchi et al.

[11] Patent Number: 5,251,083
[45] Date of Patent: Oct. 5, 1993

[54] FLYING HEAD SLIDER AND METHOD OF PRODUCING THE SAME

[75] Inventors: Yoshinori Takeuchi, Ishioka; Yuzo Yamaguchi, Tsuchiura; Fumitaka Muranushi; Katsuyuki Tanaka, both of Ibaraki; Kanji Kawakami, Hiratsuka; Hiroshi Daito, Kanagawa; Tetsuo Masukawa, Odawara, all of Japan

[73] Assignee: Hitachi, Ltd., Tokyo, Japan

[21] Appl. No.: 895,134

[22] Filed: Jun. 8, 1992

Related U.S. Application Data

[63] Continuation of Ser. No. 529,452, May 29, 1990, Pat. No. 5,128,821.

Foreign Application Priority Data

May 29, 1989 [JP] Japan .................. 1-132630

[51] Int. Cl.5 .................................. G11B 5/60
[52] U.S. Cl. .................................. 360/103
[58] Field of Search .......................... 360/103

[56] References Cited

U.S. PATENT DOCUMENTS

| 3,823,416 | 7/1974 | Warner | 360/122 |
| 4,734,803 | 3/1988 | Nishihira | 360/103 |
| 4,841,395 | 6/1989 | Craft | 360/103 |
| 4,870,519 | 9/1989 | White | 360/103 |

FOREIGN PATENT DOCUMENTS

| 387444 | 6/1986 | European Pat. Off. | 360/103 |
| 57-569 | of 1982 | Japan . | |
| 60-29987 | 2/1985 | Japan | 360/103 |
| 60-101781 | 6/1985 | Japan | 360/103 |
| 61-120329 | 6/1986 | Japan | 360/103 |
| 61-204878 | 9/1986 | Japan | 360/103 |
| 62-231481 | of 1987 | Japan . | |
| 62-279515 | 12/1987 | Japan | 360/103 |

Primary Examiner—A. J. Heinz
Attorney, Agent, or Firm—Antonelli, Terry, Stout & Kraus

[57] ABSTRACT

A flying head slider has a slider body in which gas bearing rails are formed on a surface thereof disposed in opposed relation to a recording medium. A bleed portion is also provided at the surface of the slider body between a pair of gas bearing rails. The bleed portion is composed of at least a rectangular-shaped deep bleed portion in which the pair of longer sides thereof are directioned in parallel to the longitudinal axis direction of the gas bearing rails.

20 Claims, 10 Drawing Sheets $a \doteqdot b > c$

TWO-DIMENSIONAL BEARING COMPRESSION COEFFICIENT $$\Lambda b = \frac{6\mu \; U_x \; l_x}{p_a (h_m)^2} \left(\frac{l_b}{l_x}\right)^2$$

FLYING HEAD SLIDER AND METHOD OF PRODUCING THE SAME

This is a continuation of application Ser. No.07/529,452, filed May 29, 1990, now U.S. Pat. No. 5,128,821.

BACKGROUND OF THE INVENTION

1. Field of the Invention

This invention relates to a flying head slider which flies or floats at a microscopic distance above the surface of a moving recording medium, a method of producing such a flying head slider, and a magnetic disk unit provided with such a flying head slider.

2. Prior Art

One example of conventional flying head sliders for a magnetic disk unit is a so-called taper flat-type slider, as disclosed in U.S. Pat. No. 3,823,416, which has a pair of straight gas-bearing rails at opposite side portions thereof, each gas bearing rail having a flat surface portion, and a slightly-inclined surface portion at a gas inflow side. Formed between the two gas bearing rails is a bleed portion which has a sufficient depth so as not to perform a gas-bearing function. The actual depth of the bleed portion is not less than 100 μm at the boundary between the bleed portion and the gas bearing rail.

U.S. Pat. No. 4,734,803 discloses another type of slider in which each gas bearing rail is greater in width (rail width) at a gas inflow portion thereof than at the remainder of this rail, and optionally, the gas outflow end portion of the gas bearing rail flares into a fan-shape so as to facilitate the mounting of a magnetic transducer.

Because of the straight configuration of the gas bearing rails, such conventional sliders are produced by forming a groove, serving as the bleed portion, in the slider body by a mechanical grinding process using a slicer or the like. Alternatively, such sliders are produced by fixedly bonding a flat plate, constituting a flying surface, to the slider body by a bonding material such as glass.

Recently, to meet a high-density design of the unit, it has been required to micronize the target flying height. As a result of the micronization of the flying height, it has been necessary to miniaturize the slider and to reduce a dimensional tolerance of each part in order to decrease an allowable fluctuation of the flying height as well as variations in the flying height.

As a result of the micronization of the flying height, the gas bearing function of the gas bearing rails has been increasingly affected or influenced by the compression properties of the gas, and there is a possibility that as a result of the miniaturization of the slider, there occur unstable flying behaviors due to deterioration of the stiffness of gas film and deterioration of vibration damping characteristics of the gas film.

Further, as a result of the micronization of the flying height and the miniaturization of the slider, it has been necessary to reduce the rail width of each gas bearing rail. The result is that it has become difficult to mount a film-type head on the outflow end of the gas bearing rail.

Further, in the slider of the type in which the rail width of the gas inflow portion of the gas bearing rail is greater than the rail width of the remainder of the rail, the gas bearing region at the gas outflow end portion is small. Therefore, the generation of the pressure at this portion is small, and the rigidity at the outflow end portion is reduced not only in a pitching direction of the slider but also in an upward/downward direction and a rolling direction, which results in a problem that the fluctuation of the flying height becomes larger as compared with the conventional taper flat-type slider.

Further, in the case where the slider is formed by a mechanical grinding process, it is difficult to control the dimensional tolerance on the order of micron meters, and the slider can be chipped during the machining.

Still further, in the case where the slider is formed by fixedly bonding together a slider body and a flying surface portion which are separate from each other, there are encountered problems, such as an error in positioning of the bonded two members relative to each other, deformation of the flying surface, and difficulty of mass-productivity.

Thus, in the conventional sliders and the conventional methods of producing such sliders, there have been encountered problems with respect to the flying stability and the flying dynamic characteristics (particularly, the pitching stiffness and the vibration damping characteristics of the gas bearing), and there have also been problems with the precision and the mass-productivity.

SUMMARY OF THE INVENTION

It is an object of this invention to provide a flying head slider which is subjected to less flying variations, and can achieve good flying dynamic characteristics.

Another object of the invention is to provide a method of producing such a flying head slider.

A further object of the invention is to provide a magnetic disk unit provided with such a flying head slider.

A flying head slider according to the present invention has a plurality of gas bearing rails causing the slider to fly. Each of the gas bearing rails consists of three portions, that is, an inflow portion disposed at an inflow side of a gas stream so as to produce a large pressure, an outflow portion disposed at an outflow side of the gas stream so as to produce a large pressure, and a connective portion interconnecting the inflow portion and the outflow portion in a common plane. The gas bearing rail surface of the connective portion is smaller in total width than the gas bearing surfaces of the inflow portion and the outflow portion, and therefore the connective portion serves to suppress the compression of the gas. One of the opposite sides or borders of each gas bearing rail spaced from each other in the direction of the width of the gas bearing rail is substantially straight.

A shallow groove of a bleed portion of the slider is formed by an etching process such as sputtering, and a deep groove of the bleed portion is formed by a mechanical grinding process using a slicer or the like. Thus, the bleed portion is formed using the etching process and the mechanical grinding process in combination.

In the slider of the invention, the gas bearing rails can be formed on the slider body (substrate) by a film having a good durability, using a printing technique or a film producing technique such as sputtering.

A magnetic disk unit according to the present invention comprises a recording medium for storing information, the above-mentioned flying head slider carrying a head for reading and writing information relative to the recording medium, and a carriage for moving the slider to a selected position.

In the above flying head slider, each gas bearing rail is constituted by three portions, that is, the inflow portion, the outflow portion, and the connective portion interconnecting the inflow and outflow portions. The connective portion is smaller in total width than the other two portions, and therefore suppresses the compression of the gas. With this construction, the gas flowing to the gas bearing surface is abruptly compressed as the gas proceeds from an inclined surface portion to a flat surface portion, and then reaches the connective portion, thereby producing a large pressure at the inflow side. For example, the total width of the rail surface of the connective portion is smaller, and therefore a part of the gas applied to the connective portion flows directly out of the gas bearing rail. The remainder of the gas flowing along the connective portion continues to be compressed; however, since the rail width of the connective portion is smaller, such remainder gas can easily flow in the direction of the width of the rail. As a result, the compression of the gas is suppressed or relieved, thereby reducing adverse effects caused by the compressive properties of the gas. Also the damping characteristics of the gas bearing vibrations are improved, and an appropriate pressure is produced at the connective portion. At the subsequent outflow portion, the rail width is again increased. Therefore, both gas flowing along the connective portion and the gas flowing out of the gas bearing rail at the connective portion flow along the outflow portion, and are compressed there to produce a large pressure. Here, if the depth of the portion which is provided to form the connective portion and is lower than the bearing rail surface is reduced, for example, to less than about several tens of $\mu$m, the vibration damping characteristics can be further improved by a throttling effect of the step at the outflow side. Another advantage is an increase of the gas bearing rigidity in the case of a frequency of not less than 1 kHz. The deterioration of the damping characteristics due to adverse effects of the compressive properties resulting from the high compression at the gas bearing rail becomes more conspicuous as the flying height becomes more microscopic.

With the above construction, even when the flying height is microscopic (for example, less than about 0.2 $\mu$m), the compression of the gas can be suppressed to a small level, and excellent damping characteristics can be achieved, thereby avoiding an unstable flying behavior. Further, the pressure distribution is such that the pressure peaks due to the gas bearing function appear at the front and rear end portions of the slider, respectively, and therefore the pitching stiffness of the gas bearing can be increased.

The outer side of the gas bearing rail in the direction of the width thereof can be straight, and the connective portion can be provided at the outer side of the slider in the direction of the width thereof. In this case, the rolling stiffness of the gas bearing can be increased.

Also, the inner side of the gas bearing rail in the direction of the width thereof can be straight, and the connective portion can be provided at the inner side of the slider in the direction of the width thereof. In this case, the connective portion can be formed by machining.

By forming the border or boundary of the gas bearing rail by a shallow shoulder, the gas bearing rail can be formed by a non-machining process such as sputtering, and the dimensional tolerance can be reduced, and the flying variations can be kept to a small level.

By providing a straight deep bleed portion in the bleed portion, the above-mentioned shallow groove can be made more shallow, and the time required for processing the shallow groove can be shortened, and its dimensional accuracy can be further increased.

By forming the gas bearing rails by a film producing technique such as sputtering, the film having excellent durability can be formed precisely.

By forming the gas bearing rails by a printing technique, the film excellent in durability can be formed precisely at low costs on a mass-production basis.

In the construction of the invention, naturally, by suitably selecting the shapes of the three portions of the gas bearing rail, the flying posture of the slider can be controlled without changing the load applying position.

DESCRIPTION OF THE PREFERRED EMBODIMENTS OF THE INVENTION

Figure 1:
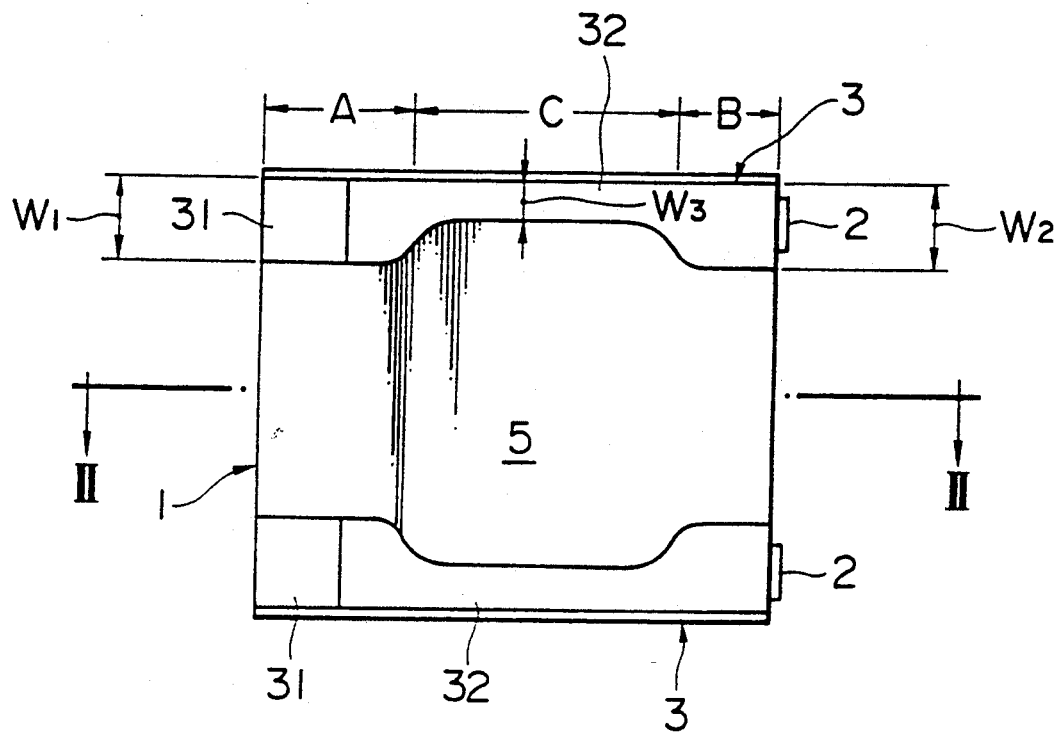
FIG. 1 is a plan view of a flying head slider provided in accordance with the present invention.
Figure 2:
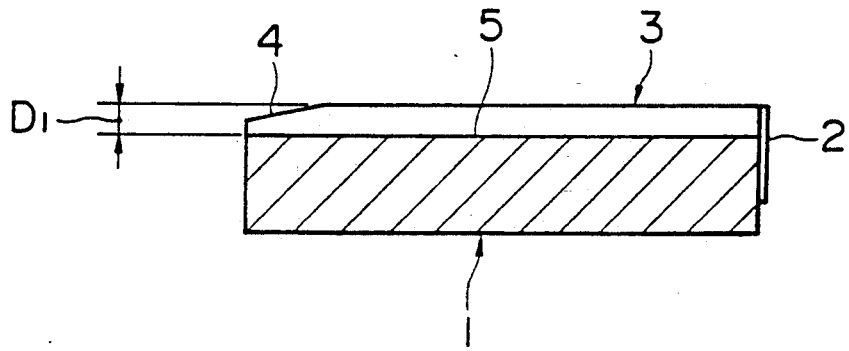
FIG. 2 is a cross-sectional view taken along the line II—II of FIG. 1.

One preferred embodiment of the invention will now be described with reference to FIGS. 1 and 2. A slider body 1 includes a pair of gas bearing rails 3 formed respectively on opposite side portions of a flying surface of the slider body 1, each gas bearing rail 3 extending along the direction of flow of gas. Each gas bearing rail 3 has a flat surface portion 32, and an inclined surface portion 31 provided at a gas inflow side. A recording-/reproducing head 2 is mounted on an outflow end of the gas bearing rail 3. The pair of gas bearing rails 3 defines opposite straight outer borders of the slider body 1, respectively. Each of the gas bearing rails 3 consists of three portions, that is, an inflow portion A, an outflow portion B, and a connective portion C interconnecting the inflow and outflow portions A and B. A laterally-recessed section (recess) is formed in the connective portion C. In order to suppress the compression of the gas, for example, the rail width W3 of the connective portion C is smaller than the width W1 of the inflow portion A and the width W2 of the outflow portion B (W1≈W2>W3).

Provided between the pair of gas bearing rails 3 is a bleed portion 5 having a depth D1 and a border with each gas bearing rail 3. The value of the depth D1 is in the range of between about 10 μm and about 20 μm, and is smaller than the conventional value of 80 to 200 μm. The boundary between each gas bearing rail 3 and the bleed portion 5 in the form of a shallow groove has three portions which are parallel to the longitudinal axis of the rail 3 at part of the three portions A, B and C, and these parallel portions are interconnected by smooth curves.

In this embodiment, since the pair of gas bearing rails 3 are formed at the outermost opposite side portions of the slider body 1, respectively, the rolling stiffness of the gas bearing rail 3 can be increased, and a fluctuation of the flying height can be kept to a small level during seek. Further, in this embodiment, as the gas, flowing to the gas bearing rails 3, proceeds from the inclined surface portion 31 (pressure-increasing means) to the flat surface portion 32, this gas is abruptly compressed and reaches the connective portion C to produce a large pressure at the inflow portion A. Since the total width of the rail surface of the connective portion C is smaller, a part of the gas directly flows out of the gas bearing rail 3 at the connective portion C. The remainder of the gas flowing along the connective portion C continues to be compressed, but can easily flow out of it in the direction of the width of the rail because of the smaller rail width of the connective portion C. As a result, the compression of the gas is suppressed at the connective portion C to avoid adverse effects caused by the compression of the gas, thereby improving the damping characteristics, thus producing an appropriate pressure at the connective portion C. Since the rail width is again increased at the subsequent outflow portion B, the gas flowing along the connective portion C and the gas flowing out of the connective portion C are both applied to the outflow portion B, and are compressed there to produce a large pressure. Here, if the depth of the bleed portion 5, which is lower than the bearing rail surface constituting the connective portion C, is made shallow, for example, on the order of not more than several tens of μm, the damping characteristics can be improved by the throttling effect achieved by the shoulder provided at the outflow side.

Also, the damping characteristics can be improved by the throttling effect achieved by the constriction of the bleed portion 5 at the outflow portions B.

Figure 3:
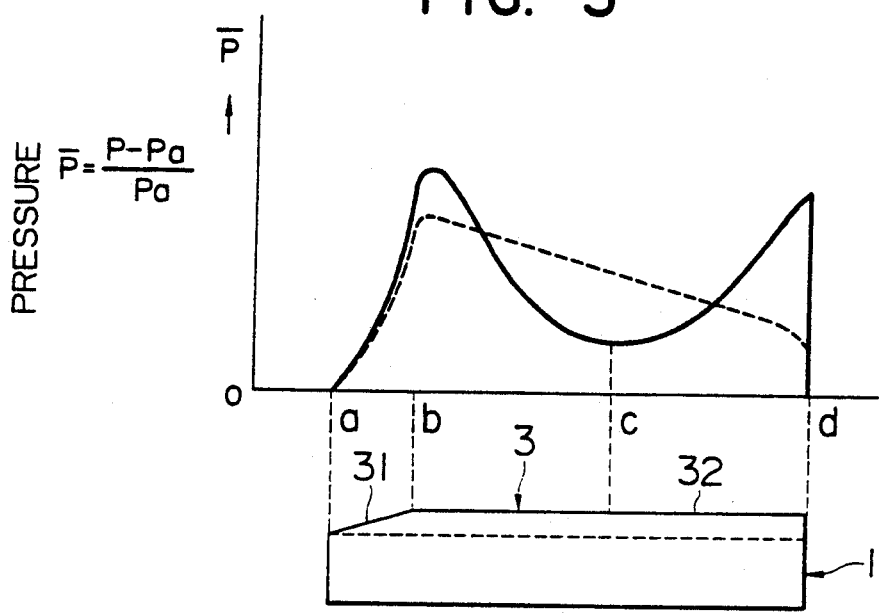
FIG. 3 is a graph showing a pressure distribution of a flying surface of the slider of FIG. 1.

Next, a pressure distribution of this embodiment will now be briefly described with reference to FIG. 3 in which a solid line represents the pressure distribution of this embodiment, and a broken line represents a pressure distribution of a conventional taper flat-type slider. The abscissa axis represents distance from the front end a (gas inflow end) to the rear end d (gas outflow end), and the ordinate axis represents the pressure.

Figure 4:
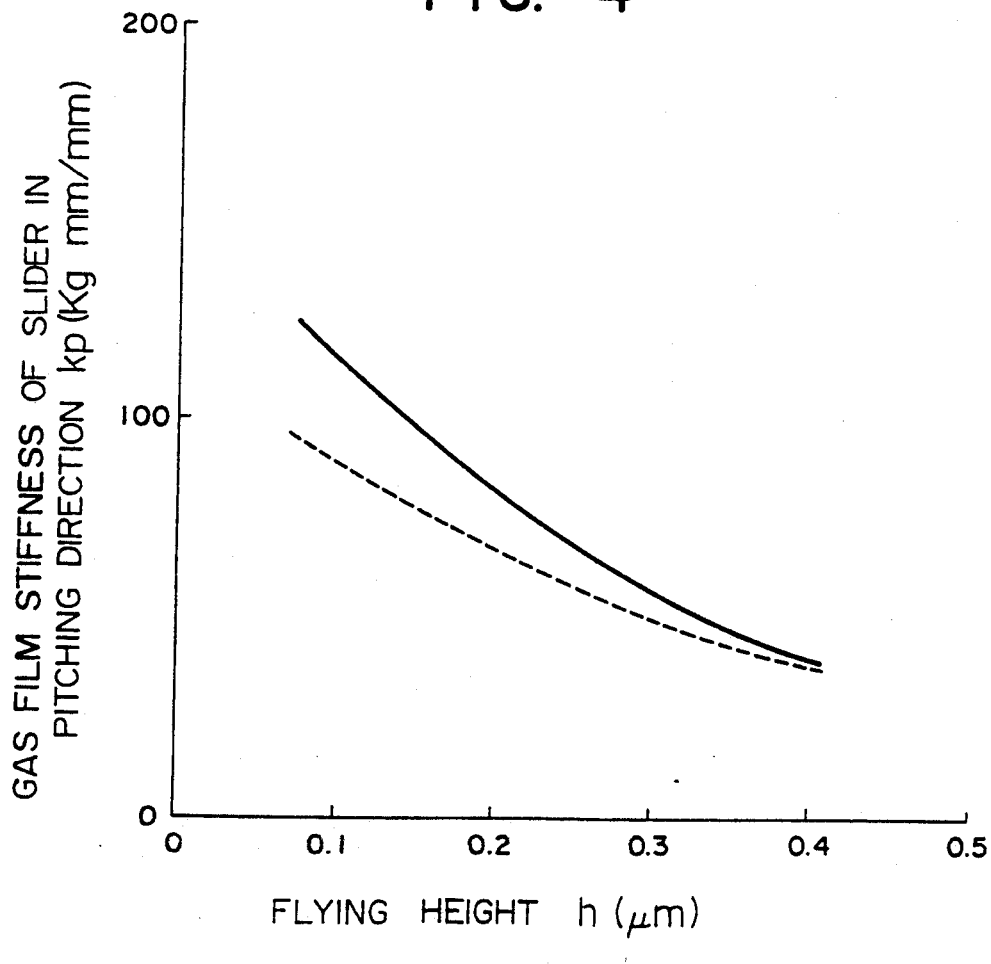
FIG. 4 is a graph showing the relation between a flying height and the stiffness of gas film in a pitching direction.

As can be seen from FIG. 3, in the conventional slider indicated by the broken line, as a result of the micronization of the flying height, influences by particle properties and compressive properties of the gas are conspicuous when the flying height at the outflow end is below about 0.2 μm. Therefore, the pressure distribution on the gas bearing rail 3 is such that the pressure is the maximum at a point immediately after the inclined surface 31, and is subsequently decreased progressively toward the outflow end. In this pressure distribution, the stiffness of the gas film of the slider in the pitching (forward and rearward) direction is small. On the other hand, in this embodiment of the invention (indicated by the solid line), the pressure increases at the inclined surface 31 (at a point b in FIG. 3), and subsequently a part of the gas flows out of the gas bearing rail 3 at the narrow central portion thereof, so that the pressure decreases at a point c. Subsequently, the pressure increases at a point d since the width of the gas bearing rail 3 is again increased. As a result, the pressure distribution is such that the peaks of the pressure appear respectively at the front and rear portions of the gas bearing rail 3, and besides since the areas of these portions are large, the stiffness of the gas film of the slider in the pitching direction can be increased as compared with the conventional taper flat-type slider. FIG. 4 shows the relation between the stiffness of the gas film in the pitching direction and the flying height. The abscissa axis represents the flying height of the slider, and the ordinate axis represents the stiffness of the gas film of the slider in the pitching direction. In FIG. 4, a solid line indicates the characteristics of the slider of this embodiment, and a broken line indicates the characteristics of the conventional slider. The trapezoid-like pressure distribution of the conventional slider indicated by the broken line occurs as the flying height becomes small and the influence by the compressive properties appears conspicuously, and therefore the stiffness kp of the gas film in the pitching direction merely increases in a small amount with the decrease of the flying height. On the other hand, since the slider of this embodiment has the pressure distribution shown in FIG. 3, the stiffness of the gas film in the pitching direction can be increased greater than that of the conventional slider, as the flying height decreases.

Figure 5:
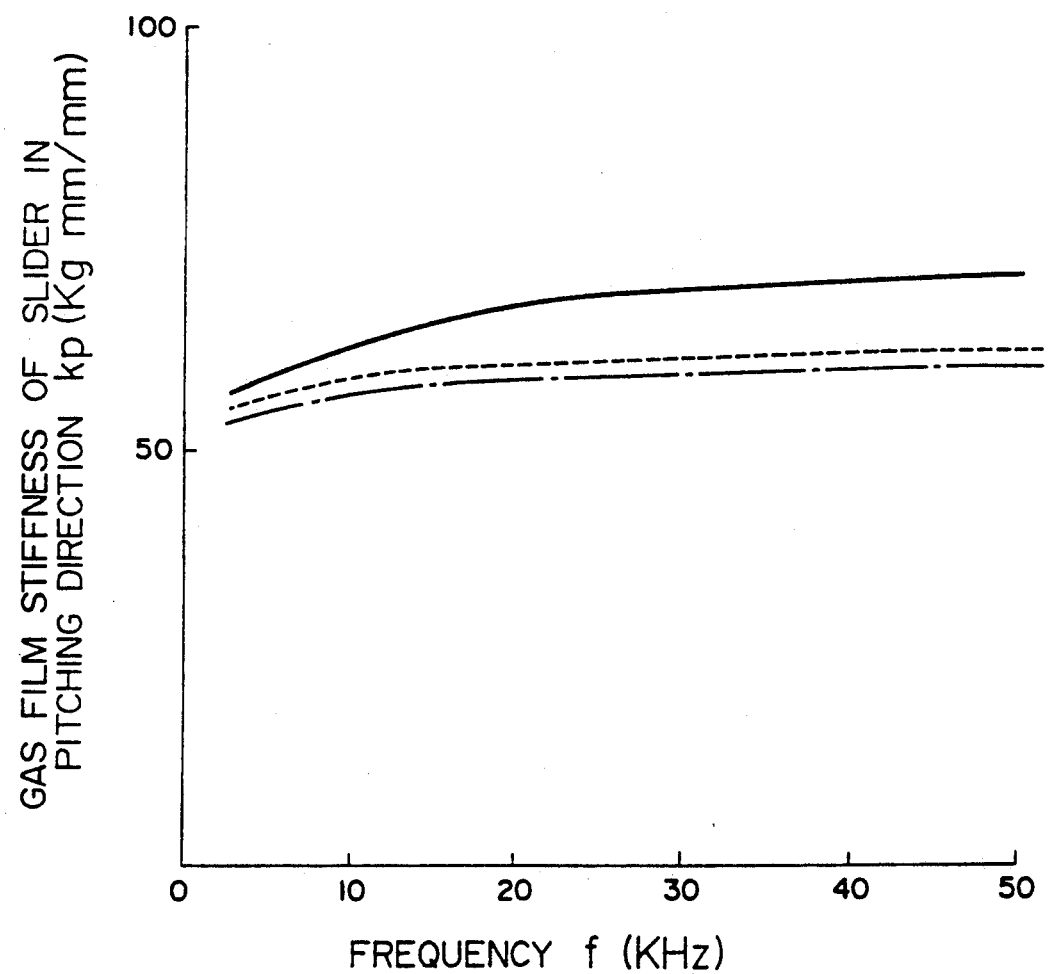
FIG. 5 is a graph showing frequency characteristics of the pitching stiffness Kp of the gas film.

FIG. 5 shows frequency characteristics of the stiffness of the gas film. The abscissa axis represents the frequency, and the ordinate axis represents the stiffness of the gas film of the slider in the pitching direction. A solid line indicates the characteristics of the slider of this embodiment, and a broken line indicates the characteristics of the conventional taper flat-type slider, and a dot-and-dash line indicates the characteristics of a conventional shaped rail slider. In the slider of this embodiment, the stiffness kp is further increased at a high-frequency region, and a response to a projection or the like on the disk can be enhanced.

Figure 6:
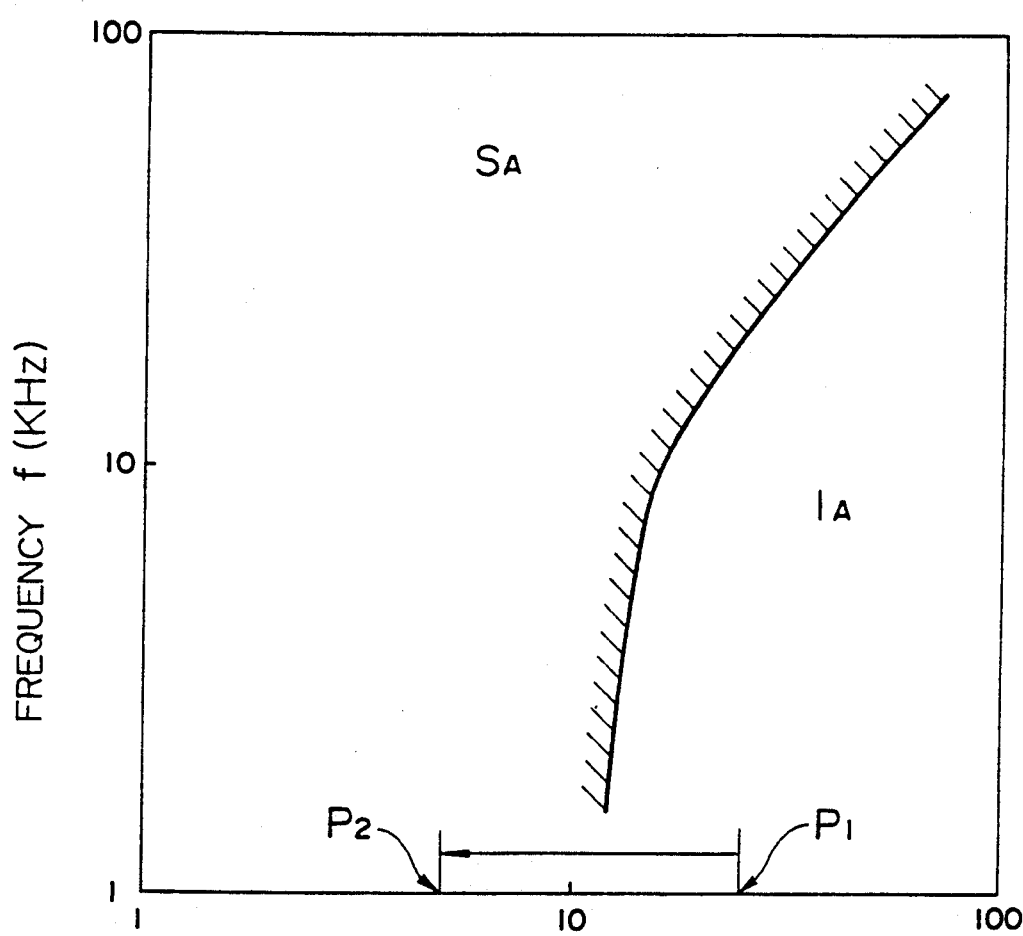
FIG. 6 is a graph showing results of judgment of the flying stability.

Another problem arising from the micronization of the flying height is a flying stability affected by the compressive properties of the gas. FIG. 6 shows results of evaluation of the flying stability. FIG. 6 gives the values calculated in accordance with RouthHurwitz's stability judgment, based on a perturbation solution (bearing stiffness and damping coefficient) of an equation of lubrication of the slider and an equation of motion of the slider. The abscissa axis indicates a two-dimensional bearing compression coefficient represented by the following formula:

$$\Lambda b = 6 \, \mu U l x / \{(pa \cdot (hm)^2\} \cdot (lb/lx)^2$$

where $\mu$ represents a viscosity coefficient, U represents a medium velocity, lx represents the length of the slider, pa represents the pressure of the atmosphere, hm represents the average flying height, and lb represents the rail width of the gas bearing rail of the slider.

The ordinate axis indicates the frequency. The reason that the ordinate axis indicates the frequency is that the bearing stiffness and the damping coefficient depend on the frequency. In FIG. 6, SA represents a stable region of the flying, and IA represents an unstable region. In the slider of the present invention, the flying condition is stable when the two-dimensional bearing compression coefficient Λb is below the value of 10 (this value is indicated by P2 in FIG. 6); however, when this compression coefficient is above the value of 10, the unstable region IA appears, and when the compression coefficient Λb is further increased, this region is further increased. In the conventional slider, the compression characteristics Λb is above the value of about 10 (this value is indicated by P1) when the flying height is below about 0.15 μm, and the unstable region IA appears. This tendency is conspicuous with the miniaturization of the slider and a large load.

Figure 7:
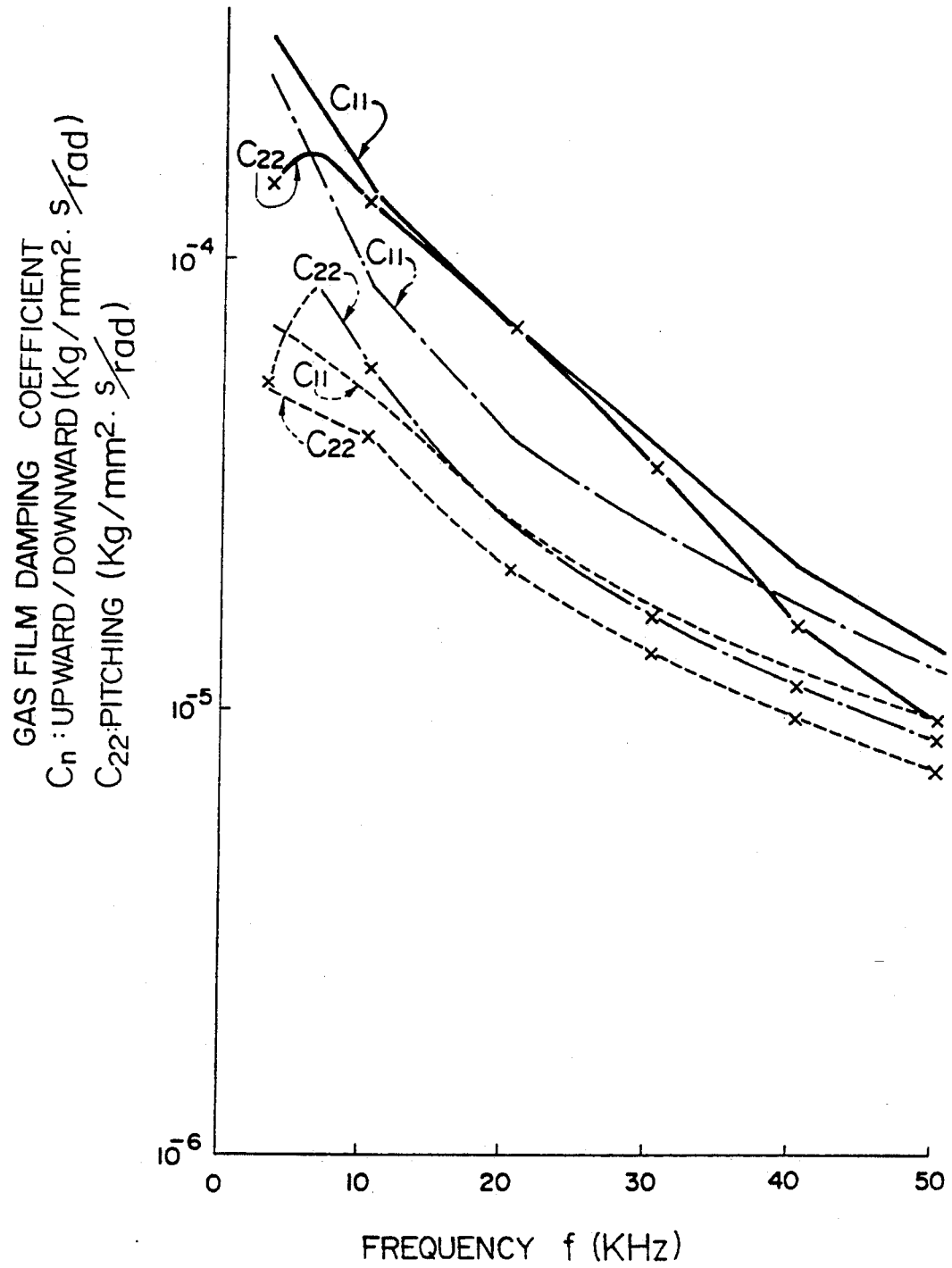
FIG. 7 is a graph showing frequency characteristics of the vibration damping coefficient of the gas film.

FIG. 7 shows frequency characteristics of an upward/downward main component C11 and a pitching main component C22 of the damping coefficient of the vibrations of the gas film. The abscissa axis indicates the frequency, and the ordinate axis represents the gas film damping coefficient. Solid lines represent C11 and C22 of the slider of this embodiment, broken lines represent C11 and C22 of the conventional taper flat-type slider, and dot-and-dash lines represent C11 and C22 of the conventional shaped rail slider. It can be seen that the slider of this embodiment has the damping characteristics which are about three times greater than those of the conventional taper flat-type slider and are about twice greater than those of the conventional shaped rail slider.

In the slider of this embodiment, the damping characteristics can be improved, and the equivalent gas bearing rail width can be reduced by the provision of the connective portion C, and the average flying height hm can be increased without changing the pivot position. Therefore, the bearing compression coefficient Λb can be reduced, and the flying instability can be prevented in the practical operating condition.

Further, the width of the bleed portion 5 increases from the direction of flow of the gas, and then decreases, and the depth and inclination of the groove are less sensitive than those of the conventional constructions. Practically, in view of variations of the flying height due to the machining precision, the depth D1 of the groove is kept to about 20 μm which is smaller as compared with the conventional constructions.

With this construction of this embodiment, the flying surface configuration can be formed by a non-machining process such as sputter-etching, and by a high precision processing, there can be obtained the slider which is small in flying variations, has a high pitching stiffness, and can fly in a stable condition.

In the above construction of the invention, the mounting of the film-type transducer is not limited by the rail width of the gas bearing rail 3 which would be restricted by the slider shape and a pressing load, and therefore a film-type head can be mounted on the slider.

Further, when the slider of the above construction is applied to a rotary actuator-type device in which case there develops an angle (hereinafter referred to as "yaw angle") between the slider and the direction of movement of the medium, adverse effects of the yaw angle on the flying height and the flying characteristics are small, and better characteristics can be obtained as compared with the conventional constructions.

Further, since the three portions of the gas bearing rail are interconnected by the smooth curves, the disturbance and stagnation of the flowing gas at the bleed portion 5 are suppressed, thereby preventing the adherence and deposition of dust.

In the above embodiment, with respect to the boundary between each gas bearing rail 3 and the bleed portion 5, that section of the boundary at the connective portion C is a straight line as at the width W3, and is connected by the smooth curves to those sections of the boundary at the inflow portion A and the outflow portion B. However, the boundary between the gas bearing rail 3 and the bleed portion 5 is not limited to the type described in the above embodiment, and similar functions and effects can be achieved by other suitable consturction.

For example, the rail widths W1, W2 and W3 of the three portions (i.e., the inflow portion A, the outflow portion B and the connective portion C) of each gas bearing rail 3 may be defined by respective parallel lines, and those sections of the three portions A, B and C where the width is gently changed at the boundary may be omitted, and instead the three portions may be interconnected in such a manner that the width may be changed abruptly. With this arrangement, the required points on the coordinates for determining the shape of the rail are reduced, thereby enhancing the dimensional accuracy in the manufacture of the slider. Similar effects as described in the above embodiment can be achieved except for the adherence of dust at the abruptly changing portions of the rail width.

Further, that section of the boundary at the connective portion C of the gas bearing rail 3 may be formed by a gently-changing curve so as to prevent the adherence of dust more effectively. Also, that section of the boundary at the connective portion C of the gas bearing rail 3 may be formed by a gently-changing straight line. The rail width W1 and rail width W2 of the inflow portion A and the outflow portion B of the gas bearing rail 3 may increase toward the inflow end and the outflow end of the rail 3, respectively. The rail width W3 of the connective portion C of the gas bearing rail 3 may decrease progressively toward the outflow portion B.

In the above embodiments, although the rail width W1 of the inflow portion A is equal to the rail width W2 of the outflow portion B, these rail widths may be different from each other.

For example, if the rail width W1 of the inflow portion A is greater than the rail width W2 of the outflow portion B, the attitude angle of the slider can be greater, so that variations in the dimensional accuracy of the flying surface can be reduced. If the rail width W2 of the outflow portion B is greater than the rail width W1 of the inflow portion A, advantageously, the bearing stiffness at the outflow portion B is improved, and the mounting of the film-type head is facilitated.

In the above embodiments, the depth D1 of the bleed portion 5 (that is, the height of each gas bearing rail 3) may be smaller than the depth D3 of the front end of the inclined surface 4. With this arrangement, at those regions where the disk speed is low, the depth D1 of the bleed portion 5 can be 5 to 10 μm, which makes it possible to reduce the processing time and to improve the processing precision.

Figure 8:
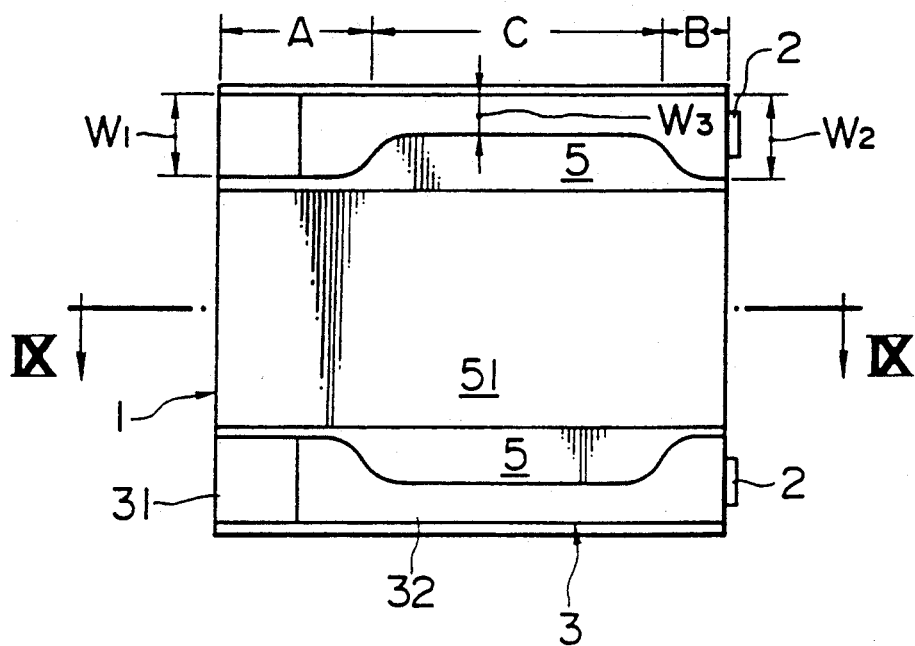
FIG. 8 is a plan view of another embodiment of a flying head slider of the invention.
Figure 9:
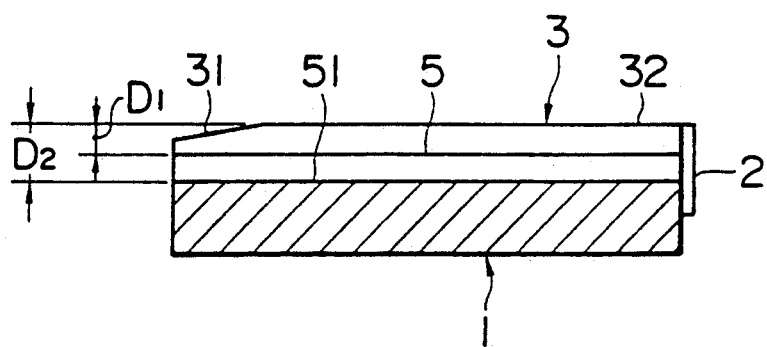
FIG. 9 is a cross-sectional view taken along the line IX—IX of FIG. 8.

FIGS. 8 and 9 show another embodiment of the invention. In this embodiment, a slider 1 has a bleed part divided into straight deep bleed portion 51 and shallow bleed portion 5. The depth D2 of the deep bleed portion 51 is in the range of between about 40 μm and about 60 μm. Since the deep bleed portion 51 is provided at the portion of the slider other than gas bearing rails 3, a high precision is not required for the deep bleed portion 51, and therefore the deep bleed portion 51 can be processed or formed by machining such as grinding. The provision of the deep bleed portion 51 reduces adverse effects on the flying variations, and therefore the depth D1 of the relatively shallow bleed portion 5 can be as small as about 5 μm to about 15 μm. This shortens the time required for processing the bleed portion 5 by sputteretching or the like, and also reduces the processing amount, which advantageously improves the processing precision.

As to a modification of the embodiment shown in FIG. 8, a plurality of deep bleed portions 51 of different depths may be provided in place of a single bleed portion 51.

In the embodiment of FIG. 8 and the above modification thereof, the rail width W1 of the inflow portion A of each gas bearing rail 3 may be different from the rail width W2 of the outflow portion B. If the rail width W1 is greater than the rail width W2, variations in dimensional precision of the flying surface can be reduced. If the rail width W2 is greater than the rail width W1, the bearing stiffness at the outflow portion B is improved, and the mounting of the head is facilitated.

Further, in the embodiment of FIG. 8 and the above modification thereof, the depth D2 of the deep bleed portion 51 may be smaller than the depth D1 of the shallow bleed portions 5 (that is, the height of the gas bearing rail 3) and the height of the front end of the inclined surface 4. With this arrangement, the time required for processing the gas bearing rail 3 can be shortened, and the processing precision can be improved.

In the above embodiments, the outer side of each gas bearing rail 3 is straight from the gas inflow end to the gas outflow end, and the inner side of the gas bearing rail 3 at the border with the bleed portion is so arranged as to change the rail width.

However, the invention is not limited to such a construction, and a reverse configuration may be adopted. Namely, the inner side of the gas bearing rail 3 may be straight whereas a recess is formed in the outer side of the connective portion C so as to change the rail width. In such a construction, the recess in the connective portion C can be machined, for example, by vertical surface grinding, and the bleed portion 5 can be machined, for example, by conventional horizontal surface grinding.

Figure 10:
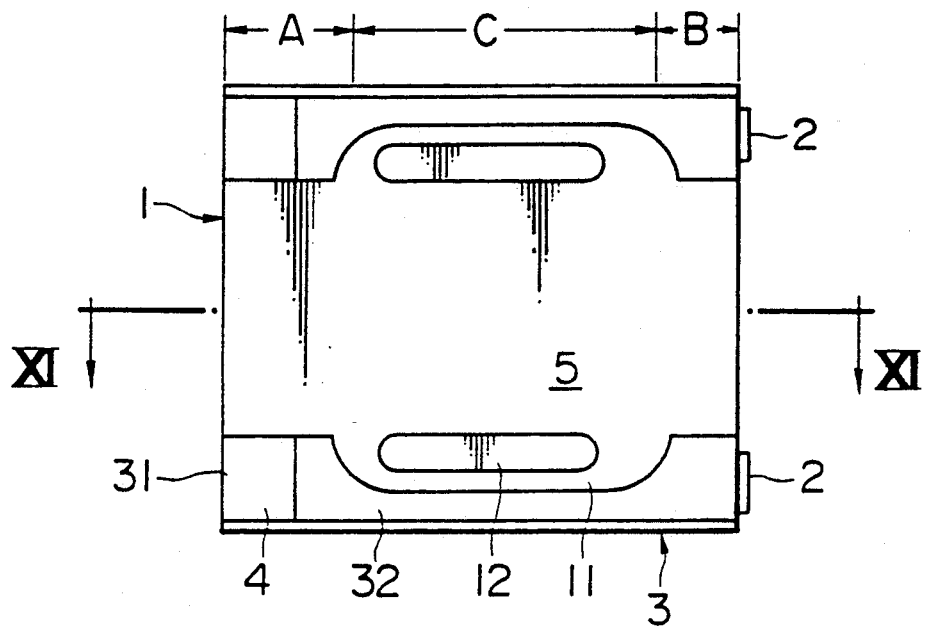
FIG. 10 is a plan view of other embodiment of a flying head slider of the invention.
Figure 11:
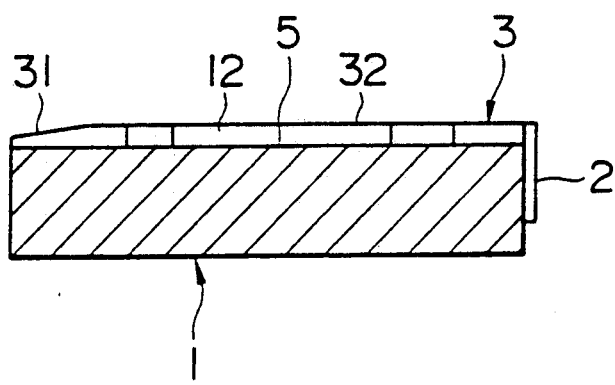
FIG. 11 is a cross-sectional view taken along the line XI—XI of FIG. 10.

FIGS. 10 and 11 shows a further embodiment of the invention. In this embodiment, an inflow portion A, an outflow portion B and a connective portion C of each gas bearing rail 3 have the same rail width, and a groove 11 is formed in the connective portion C. The groove 11 extends from a bleed portion 5, and again returns to the bleed portion 5 without reaching the outer side of the connective portion C. With this arrangement, a separate rail portion 12 is provided at each gas bearing rail 3. The separate rail portion 12 is small in rail width, and serves to further enhance the damping characteristics. The separate rail portion 12 prevents the deposition of dust at the front and rear width-changing sections of the connective portion 3.

In the embodiment shown in FIG. 10, although the groove 11 opens to the bleed portion 5, the groove 11 may open to the outer side of the slider body 1, in which case similar effects as described above can be achieved.

In the above embodiments, although the pair of gas bearing rails 3 are provided on the opposite side portions of the slider body 1, respectively, the number of the gas bearing rails 3 is not limited to two, and in view of the flying balance, a plurality of gas bearing rails may be arranged symmetrically with respect to the center line of the flow. Also, the gas bearing rail may be disposed at the center line of the flow.

Figure 12:
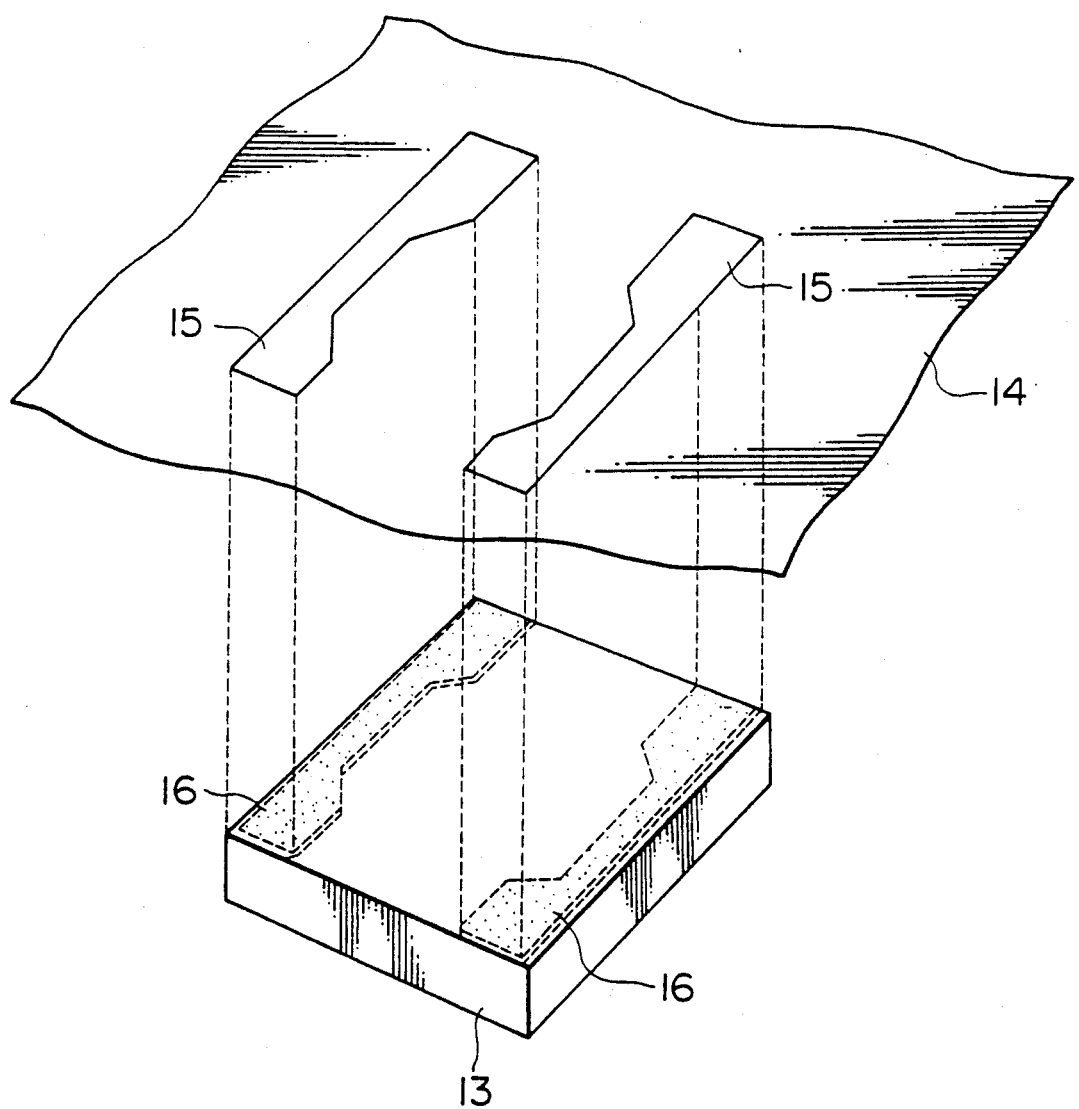
FIG. 12 is a perspective view showing a method of producing the slider of the invention.

FIG. 12 shows a method of producing a slider, according to the present invention, and in this method gas bearing rails are formed by a film producing technique such as sputtering.

In this embodiment, by using a mask 14 having holes 15 each corresponding in shape to the gas bearing rail, gas bearing rail films 16 are formed on a slider body 13 by a film producing technique such as sputtering. With this method, regardless of the material of the slider body 13, the films having a good durability and can be produced highly precisely with a good mass-productivity.

Figure 13:
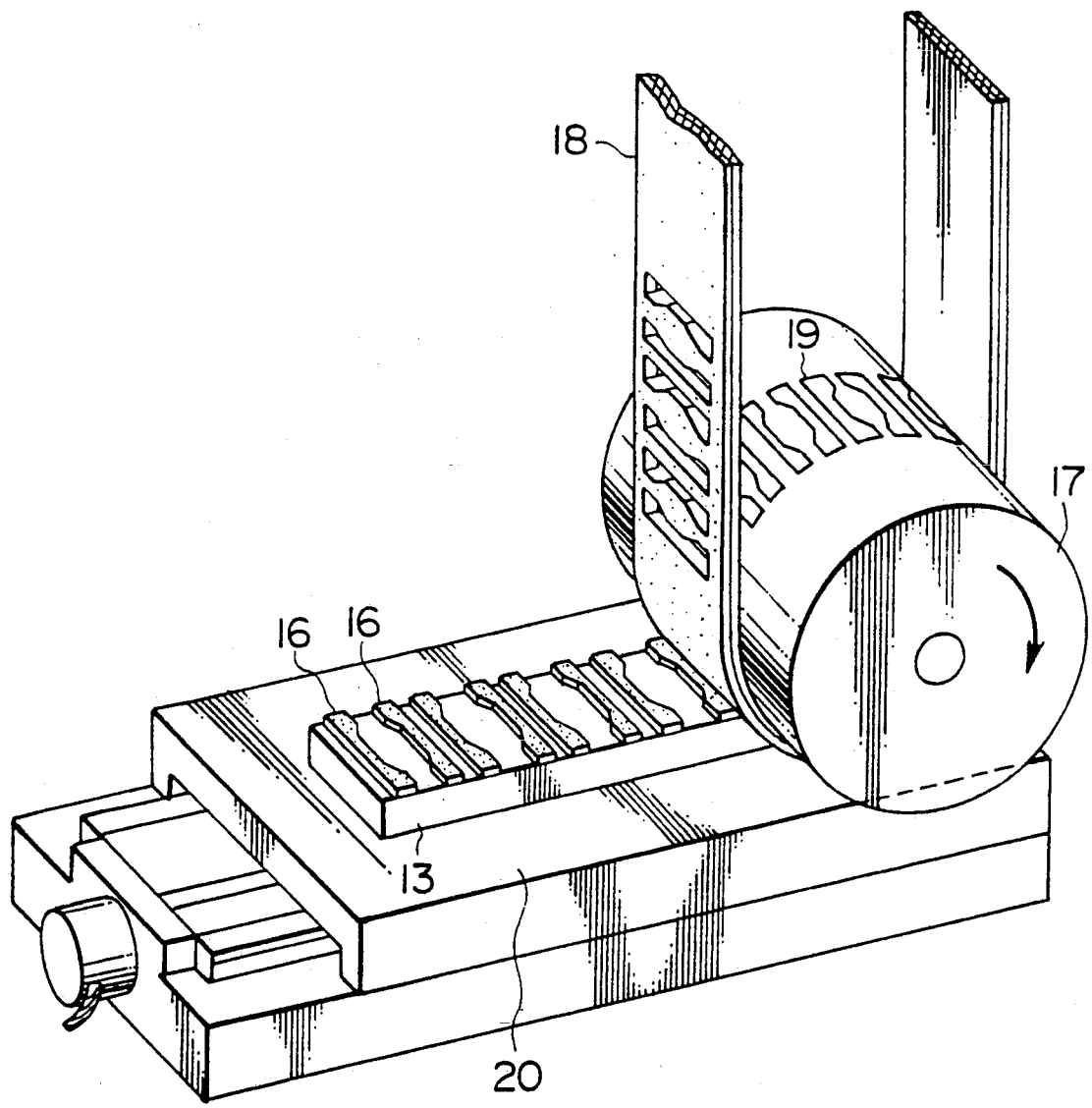
FIG. 13 is a perspective view showing a modified method of producing the slider of the invention.

FIG. 13 shows a method of producing a slider, according to a modified form of the invention, and gas bearing rails are formed by a printing technique.

In this embodiment, a transfer relief 19 having transfer raised portions for printing the gas baring rails is set on a printing roll 17. A slider body 13 is set on a table 20, and the printing roll 17 presses a transfer film tape 18 against the slider body 13 for printing purposes, so that a part of the transfer film tape 18 is transferred onto the slider body 13 to form gas bearing rail films 16 thereon. With this method, the flying head sliders can be manufactured at low costs on a mass-production basis.

In the above embodiments, the pressure distribution on the flying surface of the slider is dividedly provided on either the opposite outermost side portions of the slider or the four corner portions of the slider, and a high stiffness in the rolling direction or a high stiffness in the pitching direction can be achieved. Further, by improving the damping characteristics and by virtually reducing the two-dimensional compression coefficient, the flying instability is avoided, thereby achieving a stable flying condition. By processing the construction of the invention by a non-machining process such as sputtering, the dimensional precision can be enhanced, and the flying variations can be reduced.

With the stepped configuration of the bleed portion provided by the shallow groove and the deep groove, the deep groove can be formed by machining, and the shallow groove can be formed by a non-machining process such as sputtering, thus enabling a combined use of the machining process and the non-machining process, and the depth of the shallow groove can be small, and the processing time and the processing precision can be improved.

By providing the recess of each connective portion at the outer side portion of the slider, the gas bearing rail can be formed by machining.

Further, by forming the connective portion by the provision of the groove, the damping characteristics can be further enhanced.

Figure 14:
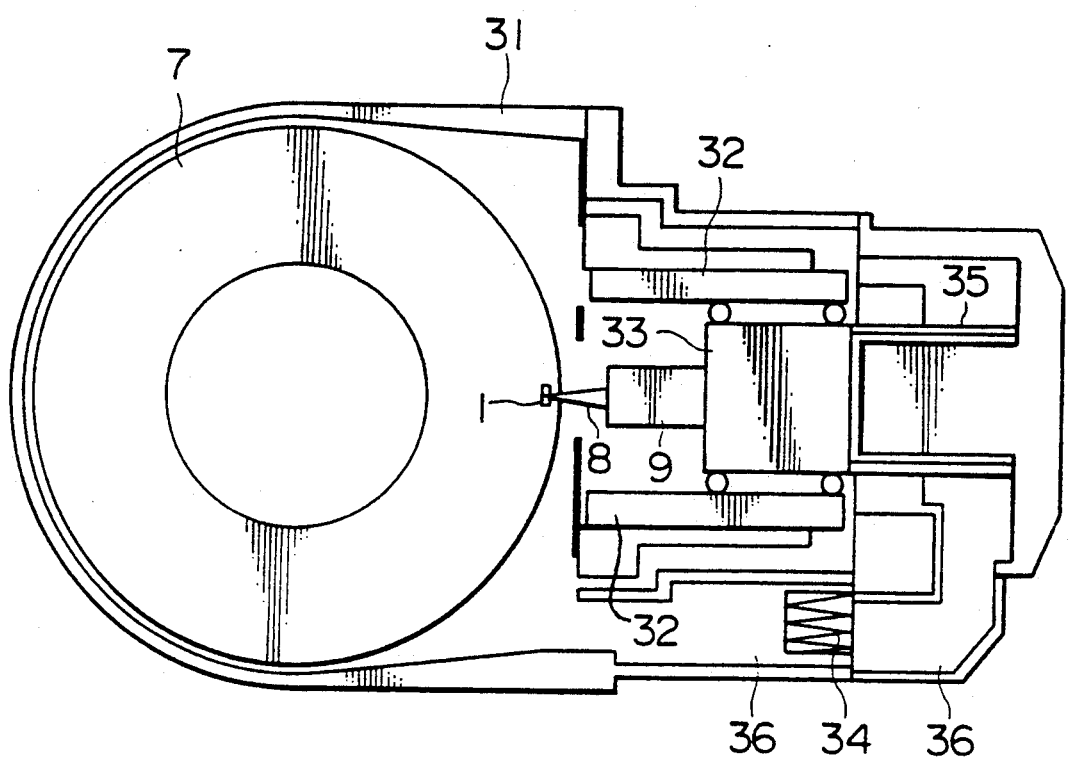
FIGS. 14 and 15 are views of magnetic disk units incorporating the slider of the invention.

FIG. 14 is a horizontal cross-sectional view of a linear rotary disk memory device (magnetic disk unit) incorporating the flying head slider of the present invention. A guide arm 9 is connected to a carriage 33, and a head support device 8 is connected to the guide arm 9, and the flying head slider 1 is mounted on the front end of the head support device 8. The slider 1 is driven by a voice coil motor 35 to move forward and backward in a radial direction of a rotating disk memory medium 7. In this embodiment, the slider flies in a stable manner with small flying fluctuation and small flying variations, and therefore the height of flying of the slider can be small, thereby achieving a high-density storage of the memory medium.

Figure 15:
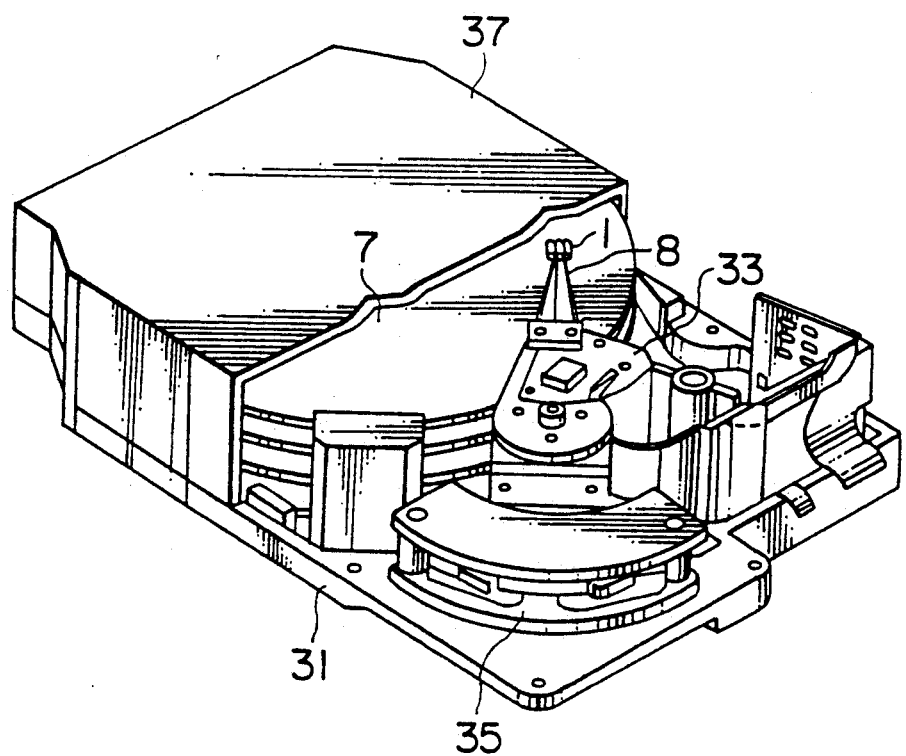

FIG. 15 is a partly-broken, perspective view of a in-line rotary disk memory device (magnetic disk unit) incorporating the flying head slider of the present invention. The flying head slider 1 of the present invention is mounted on a front end of a head support device 8 connected to a carriage 33. In this embodiment, similar effects as in the preceding embodiment can be achieved.

As described above, according to the present invention, there are provided the sliders which have small flying variations and good flying dynamic characteristics. Further, the sliders can be manufactured highly precisely and also at low costs on a mass-production basis. Further, there can be obtained the magnetic disk unit capable of a high-density recording on the recording medium.

What is claimed is:

1. A flying head slider comprising:
a slider body adapted to be disposed in opposed relation to a rotating recording medium;
a pair of gas bearing rails provided on a surface of said slider body facing said recording medium, said gas bearing rails flying said slider body by a pressure produced by a stream of gas resulted from the rotation of said recording medium;
shallow bleed portions respectively provided at said surface of said slider body along a side of each one of said pair of gas bearing rails, said shallow bleed portions being depressed with respect to gas bearing rail surfaces of said gas bearing rails and having depths from said gas bearing rails surfaces that are substantially the same; and
a deep bleed portion centrally disposed on said slider body, said deep bleed portion being depressed with respect to the gas bearing rail surfaces of said gas bearing rails and having a depth from said gas bearing rail surfaces deeper than said shallow bleed portions.

2. A flying head slider according to claim 1, wherein the depth of said deep bleed portion is more than two times as deep as the depths of said shallow bleed portions.

3. A flying head slider according to claim 2, wherein the depth of said deep bleed portion is more than 40 $\mu$m.

4. A flying head slider according to claim 2, wherein said deep bleed portion has a depth in a range of between 40 $\mu$m and 60 $\mu$m.

5. A flying head slider according to claim 2, wherein the depths of said shallow bleed portions are taken from a range having a low limit of about 5 $\mu$m and a high limit of about 20 $\mu$m.

6. A flying head slider according to claim 1, wherein the depth of said deep bleed portion is more than 40 $\mu$m.

7. A flying head slider according to claim 1, wherein said deep bleed portion has a depth in a range of between 40 $\mu$m and 60 $\mu$m.

8. A flying head slider according to claim 1, wherein the depths of said shallow bleed portions are taken from a range having a low limit of about 5 $\mu$m and a high limit of about 20 $\mu$m.

9. A flying head slider according to claim 1, wherein each one of said pair of gas bearing rails includes a curvedside which borders with a respective one of said shallow bleed portions.

10. A flying head slider according to claim 9, wherein the depth of said deep bleed portion is more than two times as deep as the depths of said shallow bleed portions.

11. A flying head slider according to claim 10, wherein the depth of said deep bleed portion is more than 40 $\mu$m.

12. A flying head slider according to claim 11, wherein the depths of said shallow bleed portions are taken from a range having a low limit of about 5 $\mu$m and a high limit of about 20 $\mu$m.

13. A flying head slider according to claim 11, wherein said shallow bleed portions have depths taken from a range between 5 $\mu$m and 15 $\mu$m.

14. A flying head slider according to claim 1, wherein said shallow bleed portions have depths taken from a range between 5 $\mu$m and 15 $\mu$m.

15. A flying head slider according to claim 1, wherein said shallow bleed portions include a pair of shallow bleed portions each one disposed between a respective end side of said deep bleed portion and an inner side of a respective one of said pair of gas bearing rails.

16. A flying head slider according to claim 15, wherein each one of said pair of gas bearing rails includes an inner side which forms a curved border with a respective one of said pair of shallow bleed portions.

17. A flying head slider according to claim 1, wherein each one of said pair of gas bearing rails includes a curved side which borders with a respective one of said shallow bleed portions and an opposing substantially straight-lined side.

18. A flying head slider according to claim 17, wherein said curved side and said straight-lined side correspond to an inner side and an opposing outer side of each one of said pair of gas bearing rails, respectively.

19. A flying head slider according to claim 18, wherein the depth of said deep bleed portion is more than two times as deep as the depths of said shallow bleed portions.

20. A flying head slider according to claim 19, wherein the depth of said deep bleed portion is more than 40 $\mu$m.

* * * * *